United States Patent
Kostas et al.

(10) Patent No.: US 11,928,411 B2
(45) Date of Patent: Mar. 12, 2024

(54) MACHINE LEARNING-BASED INTEGRATED CIRCUIT TEST CASE SELECTION FOR TIMING ANALYSIS

(71) Applicant: QUALCOMM Incorporated, San Diego, CA (US)

(72) Inventors: Lindsey Makana Kostas, San Diego, CA (US); Santanu Pattanayak, Bangalore (IN); Tushit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 17/484,536

(22) Filed: Sep. 24, 2021

(65) Prior Publication Data

US 2023/0102185 A1    Mar. 30, 2023

(51) Int. Cl.
    *G06F 30/3315*    (2020.01)
    *G06N 3/045*      (2023.01)
    *G06F 119/12*     (2020.01)

(52) U.S. Cl.
    CPC ......... *G06F 30/3315* (2020.01); *G06N 3/045* (2023.01); *G06F 2119/12* (2020.01)

(58) Field of Classification Search
    CPC ............. G06F 30/3315; G06F 2119/12; G06F 2119/18; G06F 2119/22; G06F 30/27; G06F 30/3312; G06N 3/045
    See application file for complete search history.

(56) References Cited

U.S. PATENT DOCUMENTS

| | | | |
|---|---|---|---|
| 10,107,859 B1* | 10/2018 | Saxena | G01R 31/318594 |
| 10,255,403 B1* | 4/2019 | Saurabh | G06F 30/398 |
| 10,846,453 B1* | 11/2020 | Castle | G06N 20/00 |
| 10,915,685 B1* | 2/2021 | Gupta | G06F 30/327 |
| 11,003,826 B1* | 5/2021 | Dasasathyan | G06F 30/392 |
| 11,475,194 B1* | 10/2022 | Yeung | G06F 30/3308 |

(Continued)

OTHER PUBLICATIONS

Cao P., et al., "A Timing Prediction Framework for Wide Voltage Design with Data Augmentation Strategy", Proceedings of the 13th ACM SIGPLAN International Symposium on Haskell, ACMPUB27, New York, NY, USA, Jan. 18, 2021, pp. 291-296, XP058732168, DOI: 10.1145/3394885.3431582, ISBN: 978-1-4503-8050-8, Abstract p. 291, col. 2-p. 294, col. 2.

(Continued)

*Primary Examiner* — Nha T Nguyen
(74) *Attorney, Agent, or Firm* — Patterson & Sheridan LLP

(57) ABSTRACT

Certain aspects of the present disclosure provide techniques for testing integrated circuit designs based on test cases selected using machine learning models. An example method generally includes receiving a plurality of test cases for an integrated circuit. An embedding data set is generated from the plurality of test cases. A respective embedding for a respective test case of the plurality of test cases generally includes a mapping of the respective test case into a multi-dimensional space. A plurality of test case clusters is generated based on a clustering model and the embedding data set. A plurality of critical test cases for testing the integrated circuit is selected based on the plurality of test case clusters. The integrated circuit is timed based on the plurality of critical test cases and a hard macro defining the integrated circuit.

16 Claims, 11 Drawing Sheets

(56) References Cited

U.S. PATENT DOCUMENTS

| | | | | |
|---|---|---|---|---|
| 11,645,441 | B1* | 5/2023 | Jiang | G06F 30/398 |
| | | | | 716/108 |
| 2005/0008069 | A1* | 1/2005 | Cao | G06F 30/20 |
| | | | | 375/224 |
| 2016/0357894 | A1* | 12/2016 | Frederick, Jr. | G06F 30/3312 |
| 2019/0228126 | A1* | 7/2019 | Oh | G06F 30/327 |
| 2019/0370158 | A1* | 12/2019 | Rivoir | G06F 11/3672 |
| 2021/0173993 | A1* | 6/2021 | Raman | G06N 3/08 |
| 2023/0351515 | A1* | 11/2023 | Lane | G06Q 40/06 |

OTHER PUBLICATIONS

International Search Report and Written Opinion—PCT/US2022/075306—ISA/EPO—dated Feb. 2, 2023.
Kim K., et al., "Cross-Corner Delay Variation Model for Standard Cell Libraries", IEEE Access, USA, vol. 9, May 14, 2021, pp. 72299-72315, XP011854799, DOI: 10.1109/ACCESS.2021.3080294, Abstract p. 72299-p. 72300, col. 1 p. 72301, col. 2, Paragraph 4-p. 72302, p. 72306.

\* cited by examiner

MACHINE LEARNING-BASED INTEGRATED CIRCUIT TEST CASE SELECTION FOR TIMING ANALYSIS

INTRODUCTION

Aspects of the present disclosure relate to integrated circuit design.

Integrated circuits are generally a set of electronic circuits that may be fabricated to form a complete processing unit, such as a central processing unit (CPU), graphics processing unit (GPU), neural processing unit (NPU), digital signal processor (DSP), application-specific integrated circuit (ASIC), system-on-chip (SoC), or the like. To design an integrated circuit, various software modules can be used to design various components of the integrated circuit. For example, a component of an integrated circuit may be defined as a soft macro that defines the functionality of the component irrespective of a process by which the integrated circuit will be fabricated, or a hard macro in which the functionality of the component is tied to a specific process by which the integrated circuit will be fabricated.

During the design process, various tests may be performed on an integrated circuit design before the integrated circuit design is finalized and made available to a semiconductor foundry for manufacturing (also known as being "taped out"). Some of these tests may include timing tests, in which various components of the integrated circuit and/or the entire integrated circuit is tested to ensure that timing constraints defined for the integrated circuit are satisfied. These tests may be performed against a simulated design of an integrated circuit for different sets of fabrication parameters and operating environment parameters (e.g., operating temperature, operating voltage, etc.). Because an infinite number of combinations of fabrication parameters and operating environment parameters may exist, a set of "bounding" test cases, or test cases representing extremes in fabrication parameters and/or operating environment parameters, may be used for testing an integrated circuit design. However, this may still result in the selection of a large number of test cases to use in testing an integrated circuit design. Thus, the process of testing an integrated circuit using electronic design automation (EDA) tools may still be a very resource-intensive process.

Accordingly, what is needed are techniques efficiently selecting test cases to use in testing integrated circuit designs.

BRIEF SUMMARY

Certain aspects provide a method for testing integrated circuit designs. The method generally includes receiving a plurality of test cases for an integrated circuit. Generally, each respective test case of the plurality of test cases can identify a set of operating conditions and fabrication properties for the integrated circuit. An embedding data set is generated from the plurality of test cases. A respective embedding for a respective test case of the plurality of test cases generally includes a mapping of the respective test case into a multidimensional space. A plurality of test case clusters is generated based on a clustering model and the embedding data set. A plurality of critical test cases for testing the integrated circuit is selected based on the plurality of test case clusters. Each respective test case in the plurality of critical test cases generally corresponds to a centroid of a respective test case cluster. The integrated circuit is timed based on the plurality of critical test cases and a hard macro defining the integrated circuit.

Other aspects provide a method for testing integrated circuit designs. The method generally includes receiving a data set of timing analyses associated with an input set of test cases for an integrated circuit. Each respective test case of the plurality of test cases generally identifies a set of operating conditions and fabrication properties for the integrated circuit. A test case matrix is generated based on the received data set of timing analyses. Generally, the test case matrix has dimensions on each of a plurality of axes corresponding to a number of test cases in the plurality of test cases. A plurality of critical test cases for testing the integrated circuit is selected based on the test case matrix. The integrated circuit is timed based on the plurality of critical test cases and a hard macro defining the integrated circuit.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
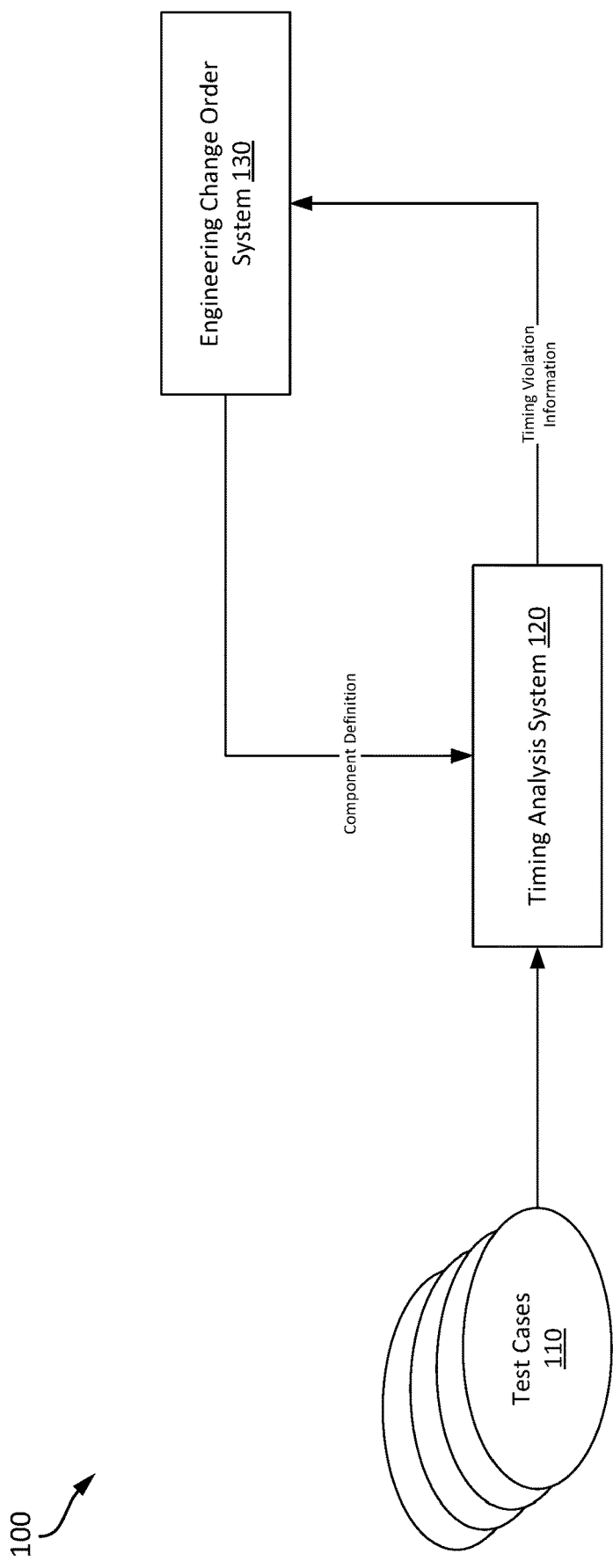
FIG. 1 illustrates an example pipeline for testing integrated circuit designs.

Aspects of the present disclosure provide apparatuses, methods, processing systems, and computer-readable mediums for testing integrated circuit designs based on critical test cases identified using machine learning techniques.

Integrated circuits are subject to variability in fabrication and operating parameters that may affect the operation of such integrated circuits. For example, variations in fabrication, such as variations in etch depths, metal or oxide layer thicknesses, impurity concentrations, and the like, may affect the resistance of individual circuits, threshold voltages, and the like. Further, an integrated circuit is generally designed to operate in different operating environments and in different performance regimes. These operating environments may be defined in terms of minimum and maximum operating temperatures, and the performance regimes may be defined in terms of an amount of compute power to use during operations (e.g., a "turbo" mode in which the processor operates at a frequency beyond a base frequency, a regular mode in which the processor operates at the base frequency, and a power-saving mode in which the processor operates at a frequency below the base frequency). The combination of fabrication parameters and operating parameters may be referred to as a process-voltage-temperature (PVT) test case.

During the development process, integrated circuits may be defined in terms of individual circuits, sub-systems, and the full system-on-chip (SoC). Various PVT test cases may be executed on simulations of these individual circuits, sub-systems, and the SoC itself (e.g., virtual circuits laid out in a design file or other construct illustrating spatial relationships between different components in a circuit) to ensure that the SoC and its subsystems operate as expected. For example, the simulated SoC and its subsystems may be tested to ensure that timing constraints are met so that a signal does not arrive too early or too late relative to an expected time of arrival. For circuits that fail a timing test for a given PVT test case, the design of the simulated circuit may be redesigned and re-tested. Additionally, after smaller components are validated, larger components incorporating these smaller components may be tested against the various PVT test cases to ensure that these larger components also meet the timing constraints. If the larger components do not meet these timing constraints, the larger component may be redesigned to rectify the performance issues.

Testing integrated circuit designs over any given PVT test case may be a time intensive process. As the number of PVT test cases increases for a given integrated circuit design, the computing resources (processing time, memory, etc.) may similarly increase. Thus, for an integrated circuit design with a large number of PVT test cases to be tested, corresponding to different process parameters, operating voltages (corresponding to processor speed), operating temperatures, and the like, computational resources utilization for testing an integrated circuit on an individual component, sub-system, and SoC level may correspondingly increase. Computing resource utilization may further increase as timing violations are discovered and integrated circuit designs are modified and re-tested.

Aspects of the present disclosure provide techniques for testing integrated circuit designs using a set of test cases selected from a broader universe of test cases using machine learning techniques. Generally, the selected set of test cases may be a subset of the universe of test cases and may be a representative set of test cases that allow for an integrated circuit design to be efficiently tested. For example, each test case in the selected set of test cases may be representative of a plurality of test cases that are closely related (e.g., included in a same cluster generated by a machine learning model) or may be identified based on a distance from other test cases in an embedding space so that similar test cases are not included in the selected set of test cases. By testing and revising an integrated circuit design using a set of representative test cases, computing resources used in testing integrated circuit designs may be reduced relative to testing and revising an integrated circuit design using the broader universe of test cases (which may include each PVT combination for which the integrated circuit design is to be tested).

Example Integrated Circuit Design Testing Pipeline

FIG. 1 illustrates an example testing pipeline 100 in which integrated circuit designs are tested against a plurality of test cases. As illustrated, pipeline 100 includes a timing analysis system 120 and an engineering change order system 130.

For a given integrated circuit design, a plurality of test cases 110 can be defined. These test cases 110 may include a plurality of process-voltage-temperature (PVT) test cases for the integrated circuit design. Generally, the process parameters defined in a PVT test case may include a plurality of front-end-of-line (FEOL) parameters and a plurality of back-end-of-line (BEOL) parameters. FEOL parameters may include information about conditions that impact the construction or fabrication of components within a silicon wafer on which an integrated circuit is fabricated. BEOL parameters may include information about conditions that may impact the metallization of interconnects between different components within an integrated circuit.

The operation region parameters defined in a PVT test case may include voltage and temperature parameters. The voltage parameters may be associated with different voltage regimes in which an integrated circuit is to operate. These voltage regimes may be defined for various performance levels and power utilization levels. For example, a baseline performance regime, associated with a baseline level of performance for an SoC or other integrated circuit, may be associated with a given nominal voltage. Various "turbo" modes may be defined based on voltages that exceed the nominal voltage. Various power-saving modes may likewise be defined based on voltages that fall below the nominal voltage. Temperature parameters in a PVT test case may be a range of operating temperatures in which an integrated circuit is to operate. In some cases, to test an integrated circuit design, the temperature parameters in a PVT case may be a minimum or maximum operating temperature.

Each of the test cases 110 may represent a "timed corner" in which the timing analysis system 120 determines whether an integrated circuit design meets one or more timing requirements for the integrated circuit. Generally, a timing requirement may specify an earliest time at which a signal can arrive at a destination and a latest time at which the signal can arrive at the destination. If a timing requirement is not met during a static timing analysis performed by timing analysis system 120, then timing analysis system 120 can output timing violation information to engineering change order (ECO) system 130 for processing. Generally, the timing violation information provided to ECO system 130 may identify the test case 110 that failed a static timing analysis and information about the extent to which the test case failed (e.g., a number of clock cycles prior to the earliest arrival time specified for the integrated circuit or a number of clock cycles after the latest arrival time specified for the integrated circuit).

ECO system 130 generally provides a system through which integrated circuit designers can view information about test cases 110 that failed static timing analyses performed by timing analysis system 120. Integrated circuit designers can fix timing violations identified by timing analysis system 120 by revising the design of an integrated circuit (e.g., revising a hard macro defining the layout of a component or subsystem in an integrated circuit). The revised design may be input into timing analysis system 120 for further analysis using the test cases 110. When timing analysis system 120 determines that the integrated circuit design meets timing requirements for the test cases 110 provided to timing analysis system 120 for testing, timing analysis system 120 can determine that the integrated circuit design is ready for advancement to another design stage. For example, when a component is validated against the test cases 110, the component may be combined with other components into a subsystem that may be tested by timing analysis system 120; similarly, when a subsystem is validated, the subsystem may be combined with other subsystems into an SoC that may be tested by timing analysis system 120.

Figure 2:
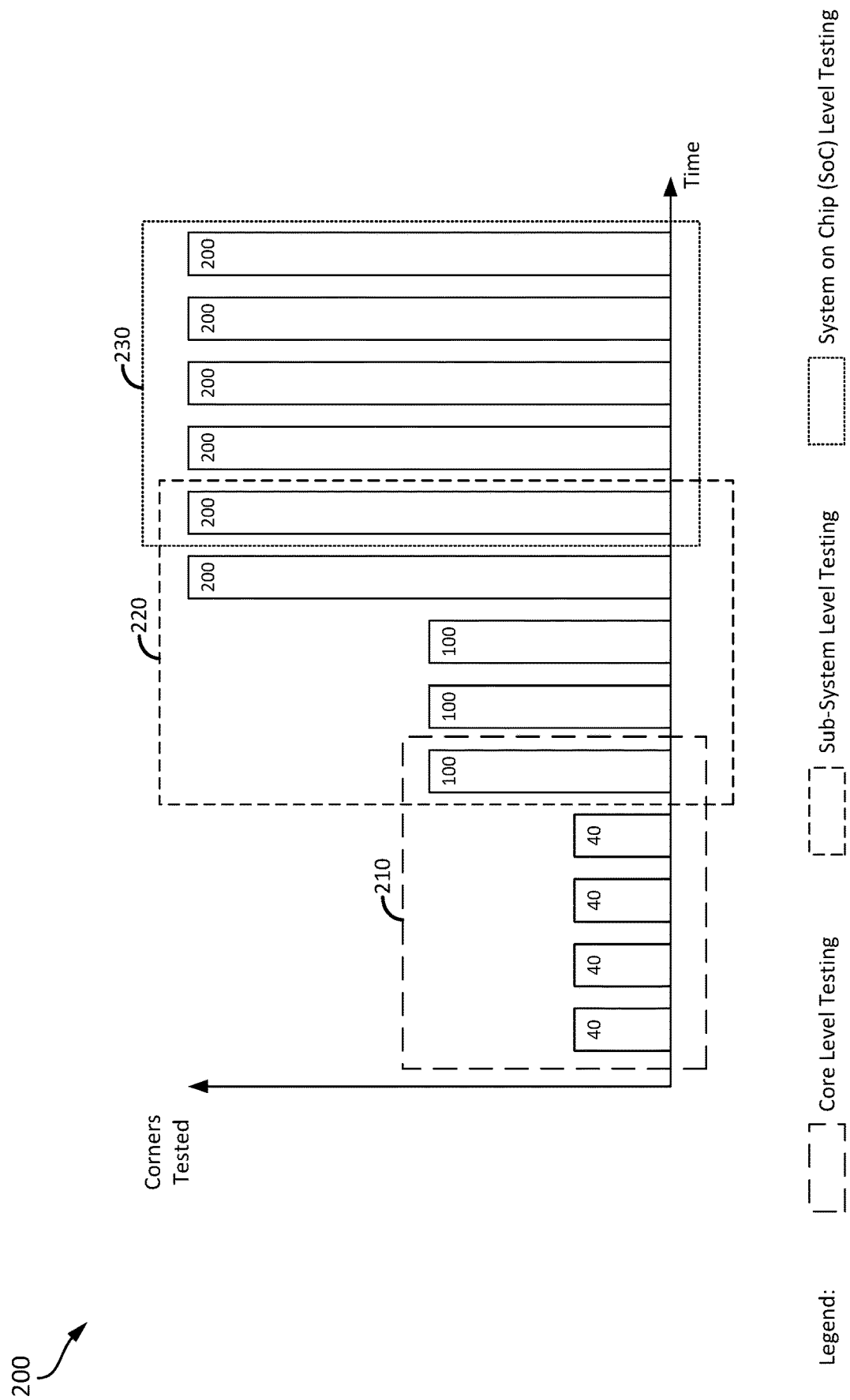
FIG. 2 illustrates an example of test cases executed against integrated circuit designs throughout a design lifecycle.

FIG. 2 illustrates an example 200 of test cases executed integrated circuit designs through a design lifecycle.

As illustrated, the design lifecycle may be divided into a plurality of stages. Core level testing stage 210 may represent testing performed on individual components in the integrated circuit; sub-system level testing stage 220 may represent testing performed on groups of individual components in the integrated circuit; and SoC level testing stage 230 may represent testing performed on groups of subsystems integrated into a full SoC design. Because testing integrated circuit designs may be a computationally expensive process, a subset of the universe of test cases may be timed initially. For example, as illustrated, a first number of test cases (e.g., 40 test cases) may be executed during testing of individual components in core level testing stage 210. As testing is performed using this first number of test cases, the design of the individual component under test may be revised to address timing violations detected during testing. As illustrated, during core level testing stage 210, the number of test cases executed (e.g., timed corners) against individual components may increase to a second number of test cases (e.g., to 100 test cases) prior to entering a sub-system level testing stage 220.

At sub-system level testing stage 220, a second number of tests cases may be executed against a sub-system component in an integrated circuit design. As discussed, a sub-system component in the integrated circuit design may include a plurality of individual components arranged to perform a particular task. During sub-system level testing stage 220, tests executed against the second number of test cases may reveal timing violations or other issues not identified in the tests executed against the first number of test cases during core level testing stage 210. Testing may be repeated until timing violations are rectified. As with the testing performed in core level testing stage 210, the number of test cases executed at sub-system level testing stage 220 may increase to a third number of test cases prior to advancing to a later testing stage (e.g., SoC level testing stage 230 illustrated in FIG. 2).

Selecting a representative set of test cases at any testing stage 210, 220, or 230 (or other testing stages not illustrated in FIG. 2) may allow for an integrated circuit design to be tested while minimizing or reducing a likelihood that an untimed corner—that is, a test case that was not tested at an earlier testing stage—will reveal timing violations when tested at a later testing stage. Because executing test cases against an integrated circuit design is a computationally expensive process, minimizing or reducing a likelihood that an untimed corner at an earlier testing stage will reveal timing violations when tested at a later testing stage may reduce the amount of computing resources (e.g., processor time, memory, network resources, etc.) used in validating an integrated circuit design. However, because of the size of the universe over which test cases may be defined, it is difficult to select a representative set of test cases to use in testing an integrated circuit design.

Aspects of the present disclosure provide various machine learning techniques for selecting test cases from an overall universe of test cases to use in testing an integrated circuit (e.g., performing a timing analysis of an integrated circuit design). Generally, the selected test cases may have similar characteristics to test cases in a larger group of test cases so that success or failure of a selected test case may be indicative of the success or failure of test cases having similar characteristics. By testing and validating an integrated circuit design using a representative set of test cases that is a subset of a larger universe of test cases representing various PVT corner cases, aspects of the present disclosure may accelerate the process of testing and validating an integrated circuit design. The likelihood that an untimed or untested corner at one stage of testing will reveal timing violations at another stage of testing may be reduced, which may also reduce computing resource utilization for testing integrated circuit designs repeatedly to address timing violations discovered in an integrated circuit design.

Example Integrated Circuit Design Test Case
Selection Based on Process-Voltage-Temperature
(PVT) Condition Clustering Some aspects of the present disclosure provide techniques for testing integrated circuit designs (e.g., timing an integrated circuit) based on a set of PVT test cases selected based on PVT condition clustering. Generally, in PVT condition clustering, clusters of PVT test cases may be generated based on an embedding or other representation of each of a plurality of PVT test case definitions. Each selected test case may correspond, for example, to a centroid of a cluster of PVT test cases or may otherwise broadly represent a set of related PVT test cases.

Figure 3:
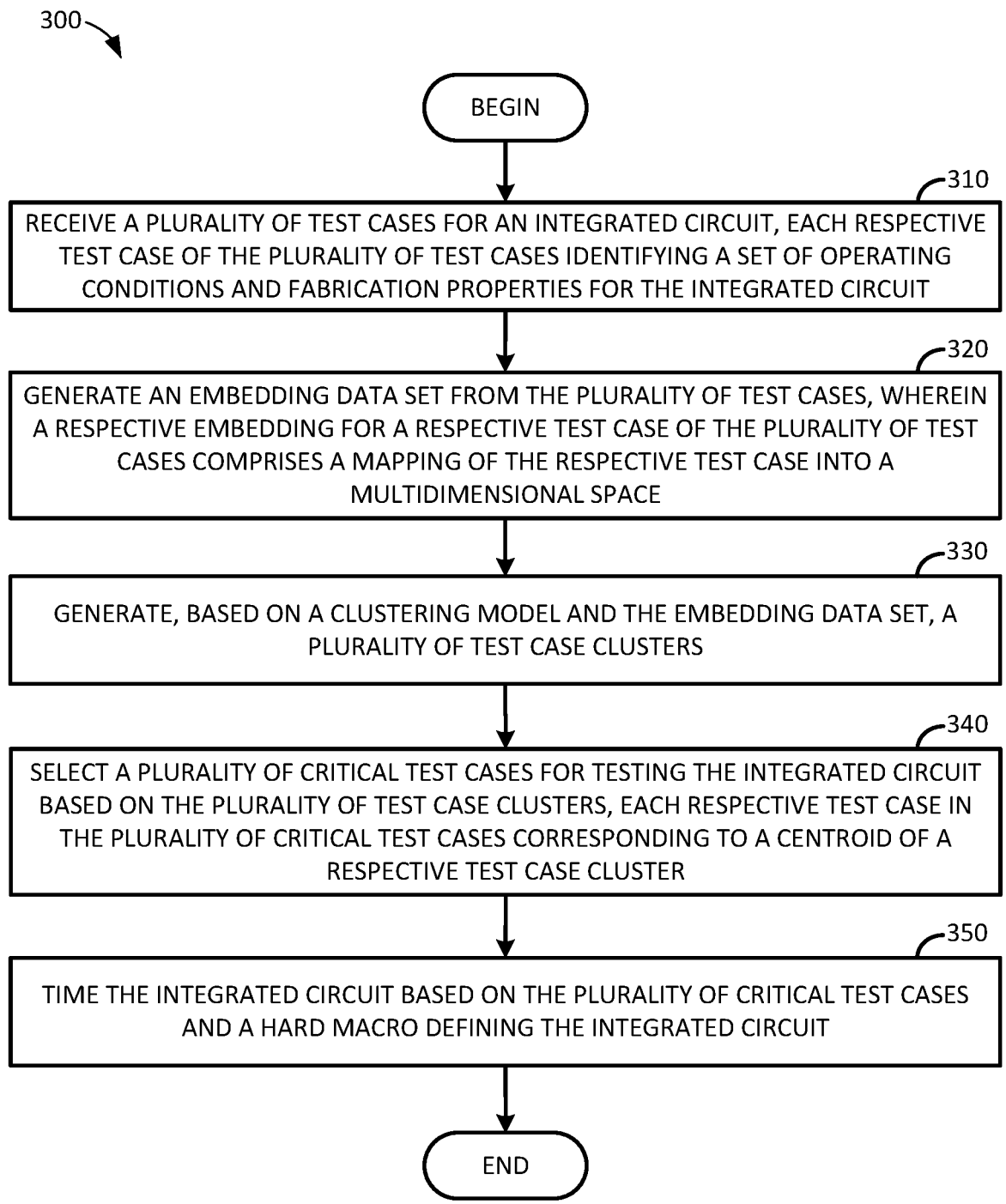
FIG. 3 illustrates example operations that may be performed by an integrated circuit testing system to test an integrated circuit design based on a set of critical test cases identified by a machine learning model, according to aspects of the present disclosure.

FIG. 3 illustrates example operations 300 that may be performed by an integrated circuit testing system (e.g., timing analysis system 120 illustrated in FIG. 1) to select a set of critical test cases and test an integrated circuit design based on the selected set of critical test cases, according to aspects described herein.

As illustrated, operations 300 may begin at block 310, where a plurality of test cases for an integrated circuit is received. Each respective test case of the plurality of test cases generally identifies a set of operating conditions and fabrication parameters for the integrated circuit.

At block 320, an embedding data set is generated from the plurality of test cases. A respective embedding for a respective test case of the plurality of test cases may include a mapping of the respective test case into a multidimensional space.

At block 330, a plurality of test case clusters is generated based on a clustering model and the embedding data set. Generally, each test case cluster may represent a group of similar test cases for which success or failure of a timing analysis performed using one test case in the cluster may generally be representative of the success or failure of a timing analysis for other test cases in the cluster.

At block 340, a plurality of critical test cases for testing the integrated circuit is selected based on the plurality of test case clusters. Generally, each respective test case in the plurality of critical test cases may correspond to a centroid of a respective test case cluster.

At block 350, the integrated circuit is timed based on the plurality of critical test cases and a hard macro defining the integrated circuit. To time an integrated circuit, the system can simulate the arrival times of various signals within the integrated circuit from a defined starting point to a defined ending point. Within the integrated circuit, various timing analyses may be performed to determine whether signals arrive at specified components within the integrated circuit at an expected time, before the expected time, or after the expected time. Generally, the design of the integrated circuit may be deemed to pass a timing test for a test case if signals arrive at the expected time or before the expected time, and may be deemed to fail a timing test for the test case if signals arrive after the expected time. If a test case is deemed to have failed, the integrated circuit may be flagged for further design revision (e.g., in an engineering change order, as discussed above), and revisions to the design of the integrated circuit may be re-tested until each test case in the plurality of test cases is executed without generating timing violations or other errors during simulated testing and timing of the integrated circuit.

In some aspects, each test case may be represented as a string defining various parameters of the test case. The string may include voltage information, temperature information, and various sub-strings encoding various process conditions (e.g., FEOL fabrication parameters, BEOL fabrication parameters, and the like). Generally, to encompass various "corner" cases, or extreme cases defining the operational boundaries of an integrated circuit design, the test cases in the plurality of test cases may include parameters specified according to a defined minimum or maximum value for an operating condition (e.g., voltage, temperature, or the like). For example, assuming an operating voltage range of 0.35V to 1.155V and an operating temperature range of −40° C. to 125° C., a set of test cases may specify one of the following sets of example operating condition parameters:
  0.35V operating voltage, −40° C. operating temperature;
  0.35V operating voltage, 125° C. operating temperature;
  1.155V operating voltage, −40° C. operating temperature; or
  1.155V operating voltage, 125° C. operating temperature.

Fabrication parameters, as discussed, may be associated with various defined substrings. For example, a FEOL substring include information that identifies information about NMOS and PMOS transistor characteristics (e.g., fast NMOS/fast PMOS; fast NMOS/slow PMOS; typical NMOS/typical PMOS; slow NMOS/fast PMOS; slow NMOS/slow PMOS; or the like). A BEOL string may identify various features of metal layers deposited on a semiconductor substrate. For example, the BEOL string may include information identifying the capacitance and resistance characteristics of each of a plurality of metal layers in a fabricated integrated circuit.

In some aspects, the embedding data set may be derived from test case names, and the embeddings can be used in a design-unaware selection of critical test cases to use in testing the integrated circuit design. Generally, to derive an embedding from test case names, numerical values such as voltage and temperature parameters can be parsed directly as numbers. Process conditions, such as FEOL or BEOL process parameters, may be encoded into values based on a defined mapping for these process conditions. For example, given the test case name:
  func_0.765v_0.765v_125c_ssgnp_cw_ccw
  the test case can be divided into two voltage parameters (0.765 v, 0.765 v), a temperature parameter (125 c), an FEOL parameter (ssgnp), and a BEOL parameter (cw_ccw). While the voltage parameters in this test case are illustrated as the same minimum and maximum voltages, it should be recognized that any range of voltage parameters may be specified in a test case name. The voltage parameters and the temperature parameter may be parsed directly as numerical values. Meanwhile, the FEOL parameter may be parsed into a plurality of numerical values: a first value associated with an NMOS switching speed characteristic (where a slow NMOS switching speed is associated with a value of −1 and a fast NMOS switching speed is associated with a value of 1), a second value associated with a PMOS switching speed characteristic (where a slow PMOS switching speed is associated with a value of −1 and a fast PMOS switching speed is associated with a value of 1), and third and fourth values associated with the g and np characteristics of the FEOL fabrication of the integrated circuit. Generally, the g characteristic corresponds to a global process corner parameter, and the np characteristic corresponds to an NMOS-PMOS cancellation parameter, and the presence of these parameters (value 1) indicate a higher performance test case than when one or both of these parameters are absent (value −1). The BEOL parameter (the "cw_ccw" parameter in this example) may be parsed into a plurality of values representing the parasitics of the circuit (e.g., where −2 represents a worst capacitance and worst resistance, −1 represents a worst capacitance and best resistance, 0 represents typical capacitance and resistance, 1 represents a best capacitance and worst resistance, and 2 represents a best capacitance and a best resistance). Thus, the embedding representation of the test case name func_0.765v_0.765v_125c_ssgnp_cw_ccw may be the vector [0.765, 0.765, 125, −1, −1, 1, 1, −2, −2], representing a mapping of the test case name into a multidimensional embedding space.

Figure 4:
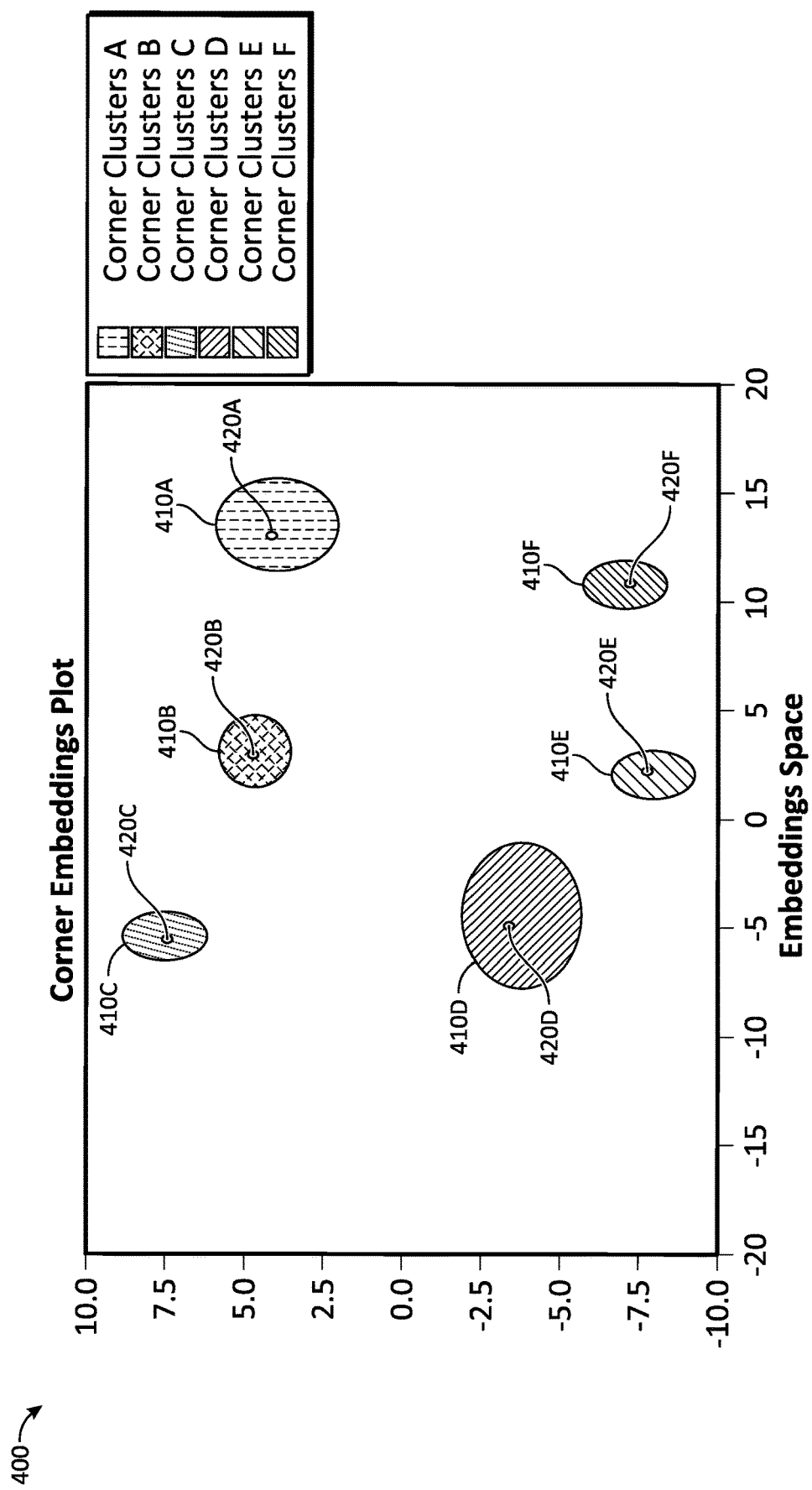
FIG. 4 illustrates example clusters of test cases and critical test cases selected from the clusters of test cases for testing an integrated circuit design, according to aspects of the present disclosure.

FIG. 4 illustrates an example clustering of test cases and critical test cases selected from the clusters of test cases for testing an integrated circuit design, according to aspects of the present disclosure. Clustering 400 may result in the generation of a plurality of test case clusters 410 in a multidimensional space. Each cluster 410, as discussed, may represent a set of test cases sharing similar test case parameters. Because the test cases in a cluster 410 may share similar test case parameters, it can be assumed that the timing performance of any given test case in the cluster 410 is representative of the timing performance of other test cases in the cluster.

Generally, test cases included in the plurality of test case clusters may be identified based on difference metrics between different test cases in a larger universe of test cases. For example, to provide for separation between different clusters of test cases (e.g., such that different clusters of test cases do not overlap or minimally overlap), clusters can be defined by maximizing an inter-cluster (e.g., between cluster) difference metric. Further, to ensure that the test cases included in any given cluster are sufficiently similar such that the timing performance of any given test case in the cluster is representative of the timing performance of other test cases in the cluster, an intra-cluster (e.g., within cluster) similarity metric may be maximized. Conversely, an inter-cluster similarity metric may be minimized, and an intra-cluster difference metric may be minimized.

As illustrated in FIG. 4, test cases 420A-F may be selected for the corresponding clusters 410A-F illustrated in clustering 400 of the universe of test cases. Each test case 420 may correspond, for example, to a centroid in the associated cluster. That is, test case 420A may correspond to the centroid of cluster 410A, test case 420B may correspond to the centroid of cluster 410B, and so on. The test cases 420A-F may then be used to perform a timing analysis on an integrated circuit design, based on an assumption that a timing analysis performed using a test case that is the centroid of a given cluster is representative of a timing analysis performed using any test case included in the given cluster.

In some aspects, test cases may be selected based on a design-aware analysis of PVT test case corners. In such a case, at least some test cases in the universe of test cases may be associated with a timing analysis defining an amount of "slack" or a size of a timing violation that exists in an integrated circuit design. Generally, the amount of slack may correspond to a number of process cycles prior to a threshold time that an integrated circuit component completes an operation, while the size of the timing violation may correspond to a number of process cycles prior to an earliest completion time or after a latest completion time at which the integrated circuit component completes an operation. Because the timing at any given set of PVT test case corners may be unique to a specific design, using test case encodings and timing information may allow for additional information to be used to identify the critical set of test cases to use in testing an integrated circuit design. Further, because PVT test cases may exist in a highly dimensional space, augmenting PVT test case definitions with timing information may improve the coherency of an output over the PVT space.

Figure 5A:
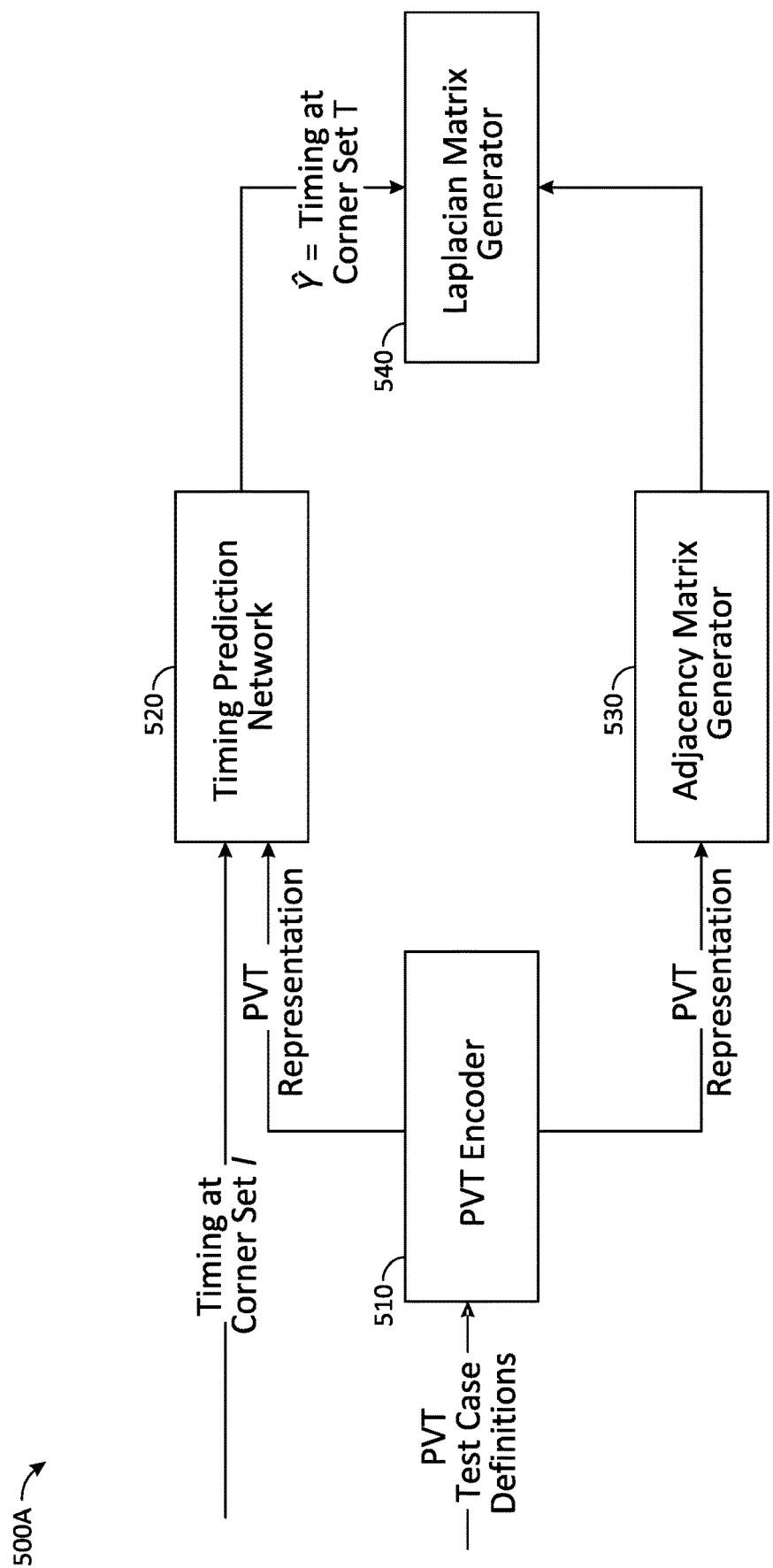
FIGS. 5A and 5B illustrate example pipelines for design-aware selection of critical test cases for testing an integrated circuit design, according to aspects of the present disclosure.

FIG. 5A illustrates an example test case selection pipeline 500A for design-aware selection of critical test cases for testing an integrated circuit design, according to aspects of the present disclosure. As illustrated, a PVT encoder 510 receives a set of PVT test case definitions from which the critical set of test cases is to be selected. As discussed above, the set of PVT test case definitions may include a plurality of test case definitions, and each individual test case definition may include information defining voltage parameters, temperature parameters, FEOL process parameters, and BEOL process parameters for an integrated circuit. PVT encoder 510 generally parses these PVT test case definitions to generate an embedding representation of the PVT test case names, which may be a vector in a multidimensional space. In some aspects, PVT encoder 510 may be structured as a feed-forward neural network trained to encode strings into vectors in a multidimensional space. In some aspects, PVT encoder 510 can use defined mappings between textual parameters and numerical values to encode a PVT test case definition into an embedding representation of the PVT test case.

The embedding representations of the PVT test cases may be output to a timing prediction network 520 and to an adjacency matrix generator 530. Timing prediction network 520 may be a deep neural network trained to predict the timing of an integrated circuit at each of a plurality of test cases based on timing information associated with corner set I of test cases provided to timing prediction network 520. Generally, the output of timing prediction network 520 may be a predicted timing for the PVT test cases at a corner set T of PVT test cases, and the predicted timing at the corner set T may be output to a Laplacian matrix generator 540 that enforces coherent predictions based on relationships between different test cases in the set of PVT test case definitions. Corner set I may be a subset of a larger set of PVT test cases, and corner set T of PVT test cases may be a larger set of PVT test cases than corner set I for which timing is predicted based on the known timing for corner set I.

Adjacency matrix generator 530 generally defines a PVT space as a graph of PVT test cases. The adjacency matrix generated by adjacency matrix generator 530 may describe relationships between different test cases (e.g., edges between different nodes in the universe of test cases).

The adjacency matrix generated by adjacency matrix generator 530 and the predicted timing output by timing prediction network 520 can be used by Laplacian matrix generator 540 to generate a Laplacian matrix that describes the test cases in the test case space. Generally, the Laplacian matrix may be generated based on a prediction loss defined by the equation:

$$\text{Prediction Loss} = \sum_{i,t}(\widehat{y_{i,t}} - y_{i,t})^2 + \lambda \sum_{i,j,t} a_{ij}(\widehat{y_{i,t}} - \widehat{y_{j,t}})^2$$

where i represents an $i^{th}$ timing result, t represents a test case for which timing is predicted using the timing prediction network 520, j represents a $j^{th}$ test case in the universe of test cases, and $\lambda$ represents a scaling factor that balances a mean squared loss and the Laplacian loss such that similar PVT test cases have similar embedding representations. Laplacian matrix generator 540 is generally configured to penalize large differences between similar test cases. After training of a corner selection model, which may be a neural network trained to minimize a Laplacian loss and used to generate the corner set I of test cases from which timing for the corner set T of PVT test cases may be predicted, the PVT encoder 510 may be optimized such that corners with similar timing profiles are co-located in an embedding space.

Figure 5B:
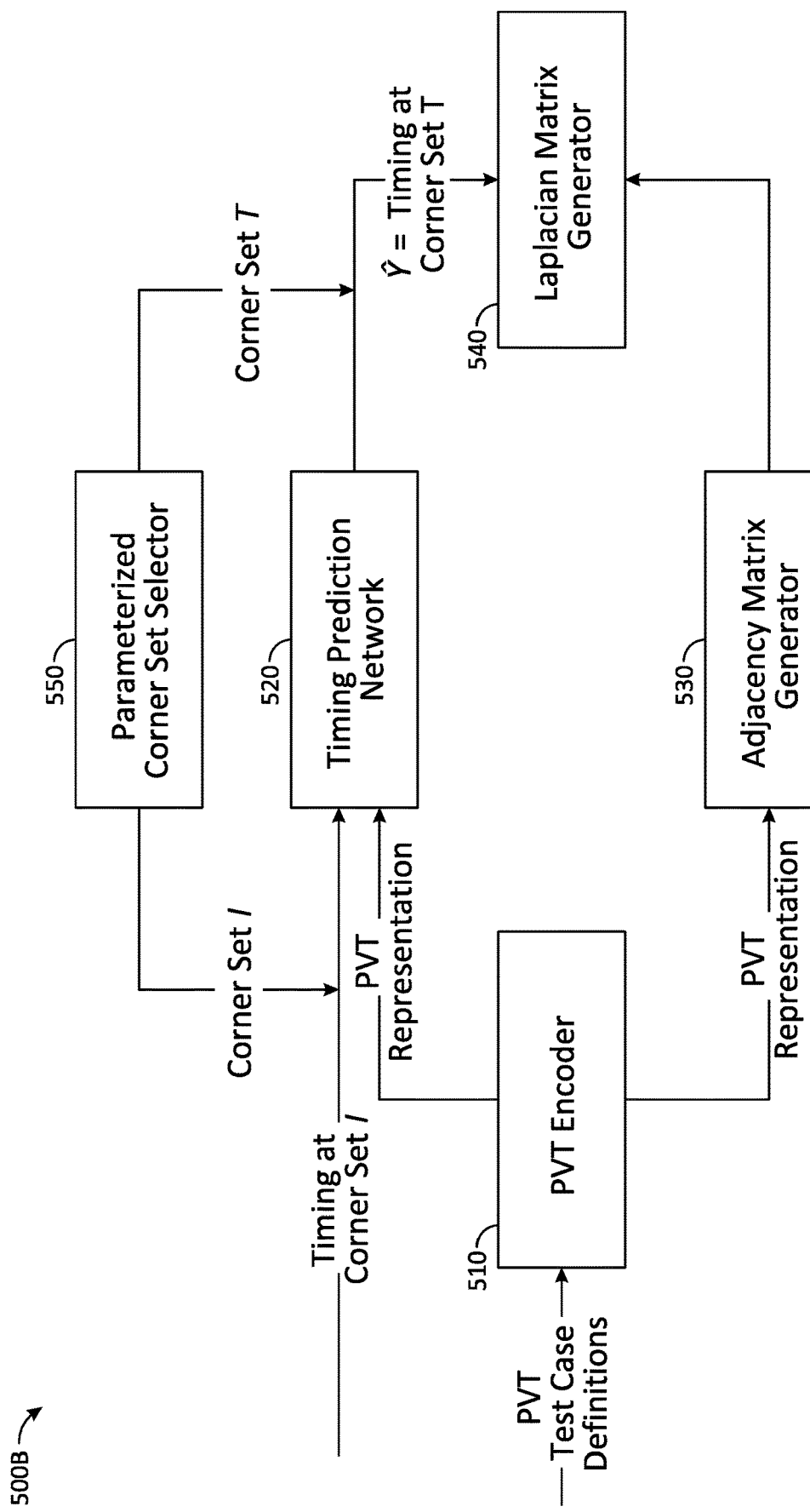

In some aspects, as illustrated in FIG. 5B, test case selection may be jointly optimized with a timing prediction model in test case selection pipeline 500B. In this example, a parameterized corner set selector 550 may be trained to select the set of test cases I for which timing is to be input into the timing prediction network and the set of test cases T for which timing is to be predicted. Generally, the set of test cases I may be a smaller set of test cases than the set of test cases T and may be predictive of the performance of the test cases in the set of test cases T. To select the set of critical test cases to be used in testing an integrated circuit design, timing analyses may be collected from testing performed on a comprehensive set of bounding test cases (e.g., corner cases in which at least one parameter is set to a minimum or maximum value, representing an extreme case in which the integrated circuit is expected to still operate normally). A timing prediction model may be trained to predict the timing for any given subset of test cases given a timing analysis at a subset of other corners.

In some aspects, parameterized corner set selector 550 may be configured to parameterize input test case selection such that the critical test cases are selected by the time a machine learning model used in selecting the test cases is trained. The parameterized corner set selector 550 may be configured to select a plurality of test cases based on a mask parameterized by a dropout probability. Because a dropout probability generally corresponds to a likelihood that a test case definition is dropped during training of a neural network, selecting test cases with a low dropout probability may ensure that critical test cases (e.g., test cases that are unlikely to be ignored in a neural network) are identified and used in predicting the timing of an integrated circuit design.

Example Integrated Circuit Design Test Case Selection Based on Timing Violation Clustering Some aspects of the present disclosure provide techniques for testing integrated circuit designs (e.g., timing an integrated circuit) based on a set of PVT test cases selected based on timing violation clustering. Generally, in timing violation clustering, clusters of PVT test cases may be identified based on predictions of a number of timing violations that may be expected for any given test case. The PVT test cases selected for use in test an integrated circuit design may thus be the test cases in which the largest numbers of timing violations are expected.

Figure 6:
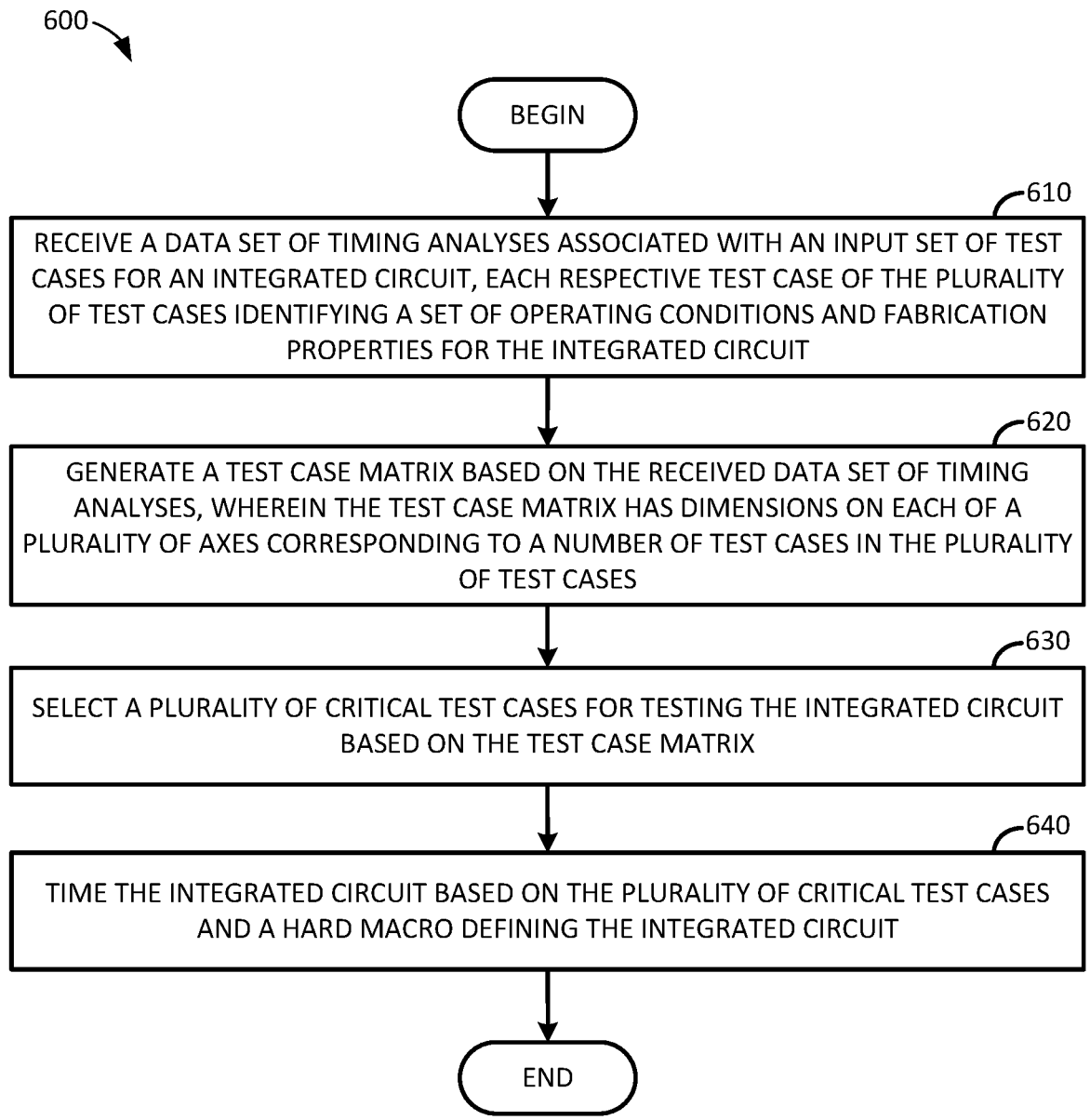
FIG. 6 illustrates operations that may be performed by an integrated circuit testing system to test an integrated circuit design based on a set of critical test cases, according to aspects of the present disclosure.

FIG. 6 illustrates example operations 600 that may be performed (e.g., by a timing analysis system 120 illustrated in FIG. 1) to select a set of critical test cases and test an integrated circuit design based on the selected set of critical test cases, according to aspects described herein.

As illustrated, operations 600 may begin at block 610, where a data set of timing analyses associated with an input set of test cases for an integrated circuit is received. Each respective test case of the plurality of test cases generally identifies a set of operating conditions and fabrication parameters for the integrated circuit.

At block 620, a test case matrix is generated based on the received data set of timing analyses. The test case matrix may have dimensions on each of a plurality of axes corresponding to a number of test cases in the plurality of test cases.

At block 630, a plurality of critical test cases for testing the integrated circuit is selected based on the test case matrix.

At block 640, the integrated circuit is timed based on the plurality of critical test cases and a hard macro defining the integrated circuit. To time an integrated circuit, the system can simulate the arrival times of various signals within the integrated circuit from a defined starting point to a defined ending point. Within the integrated circuit, various timing analyses may be performed to determine whether signals arrive at specified components within the integrated circuit at an expected time, before the expected time, or after the expected time. Generally, the design of the integrated circuit may be deemed to pass a timing test for a test case if signals arrive at the expected time or before the expected time, and may be deemed to fail a timing test for the test case if signals arrive after the expected time. If a test case is deemed to have failed, the integrated circuit may be flagged for further design revision (e.g., in an engineering change order, as discussed above), and revisions to the design of the integrated circuit may be re-tested until each test case in the plurality of test cases is executed without generating timing violations or other errors during simulated testing and timing of the integrated circuit.

In some aspects, the test case matrix may be structured as a test case violation co-occurrence matrix. In this co-occurrence matrix, timing violations shared by pairs of test cases may be recorded. Generally, shared timing violations may illustrate correlations between different test cases and may allow for the selection of test cases such that violation coverage is maximized during testing.

Figure 7:
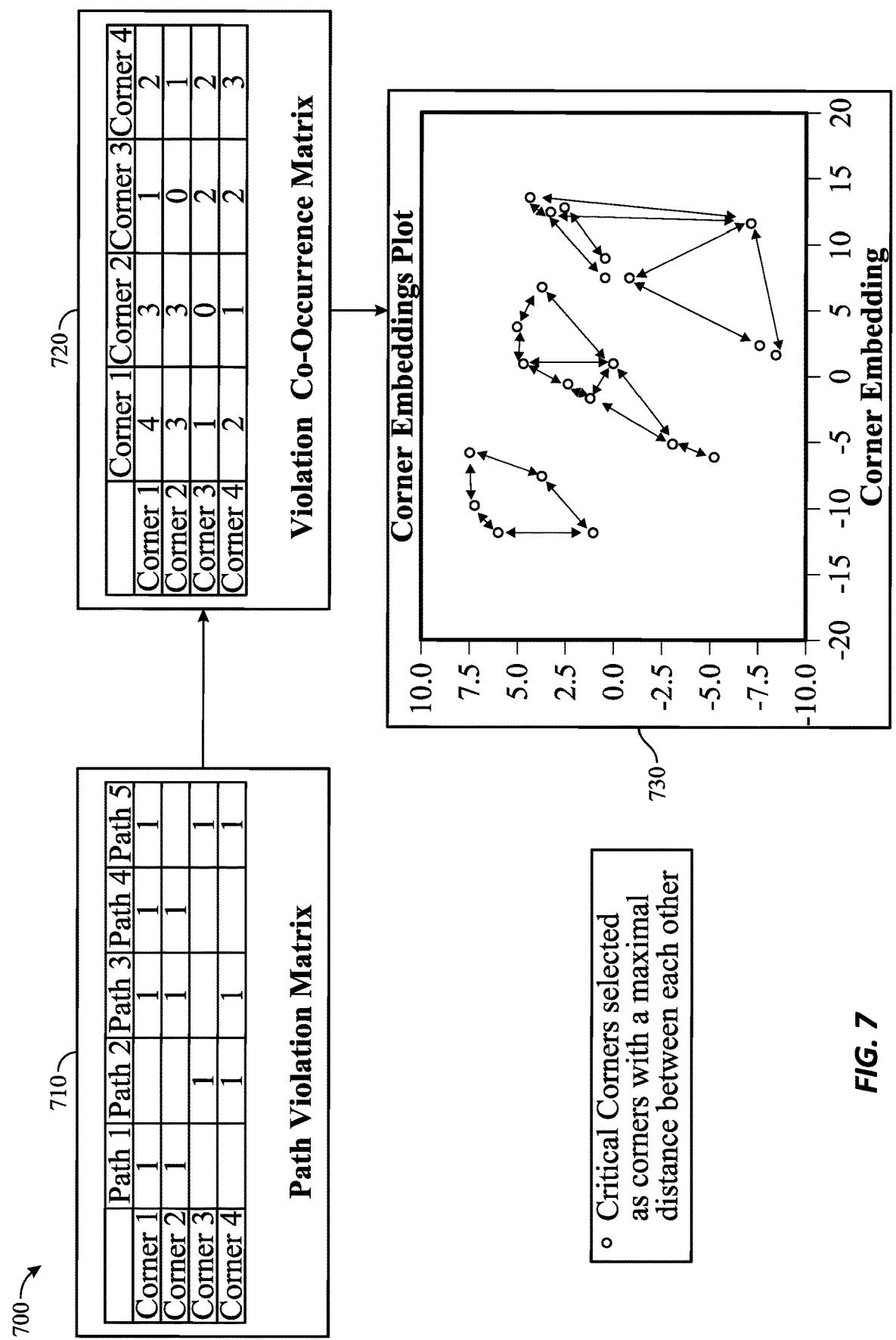
FIG. 7 illustrates an example implementation of a violation coverage-based matrix used to select a set of critical test cases to test an integrated circuit design, according to aspects of the present disclosure.

FIG. 7 illustrates an example pipeline 700 for using a violation coverage-based test case matrix to select a set of critical test cases to use in testing an integrated circuit design, according to aspects descried herein. As illustrated, pipeline 700 includes a path violation matrix 710, a violation co-occurrence matrix 720, and a corner embedding plot 730.

Path violation matrix 710 generally is a matrix generated by collecting timing analyses for each of a plurality of paths in an integrated circuit (e.g., routes through which a signal may be generated). As illustrated, each row in path violation matrix 710 corresponds to a test case, and each column in path violation matrix 710 corresponds to a path. A value of binary TRUE or some other defined value may be inserted into a cell corresponding to a test case and a path for which a timing analysis indicated a failure to meet a timing requirement. As illustrated, for test case 1, paths 1, 3, 4, and 5 were shown to have timing violations during testing; for test case 2, paths 1, 3, and 4 were shown to have timing violations during testing; for test case 3, paths 2 and 5 were shown to have timing violations during testing; and for test case 4, paths 2, 3, and 5 were shown to have timing violations during testing.

Violation co-occurrence matrix 720 may be generated based on the information included in path violation matrix 710 to illustrate a number of shared path violations that exist for any pair i,j of test cases. For example, because test case 1 and test case 2 both have timing violations for paths 1, 3, and 4, the entries for the pair of test cases 1 and 2 may have a value of 3 in violation co-occurrence matrix 720. Similar computations may be performed on the other pairs of test cases to generate the violation co-occurrence matrix.

To generate corner embedding 730 and identify the critical test cases to use in testing an integrated circuit design, a singular value decomposition may be performed on the co-occurrence matrix to extract features describing each test case. Generally, a singular value decomposition of violation co-occurrence matrix 720 may be defined according to the equation $USV^T \rightarrow U_k S_k^{0.5}$, where $V^T$ is a transpose of the matrix V, and k is a number of components from a singular value decomposition of the violation co-occurrence matrix 720. The singular value decomposition of violation co-occurrence matrix 720 may result in an embedding being generated for each test case in the violation co-occurrence matrix. The embedding may be, for example, a coordinate in a multidimensional space representing the test case. Test cases with similar violation profiles may be co-located within an embedding space, while test cases with different violation profiles may be located in different locations in the embedding space.

After the embeddings are generated for each test case, a set of critical test cases may be selected. In some aspects, the test cases in the set of critical test cases may be selected to maximize violation coverage. To do so, the test cases may be selected from corner embedding 730 by identifying a set of test cases with a maximum distance between test cases in the embedding space.

Figure 8:
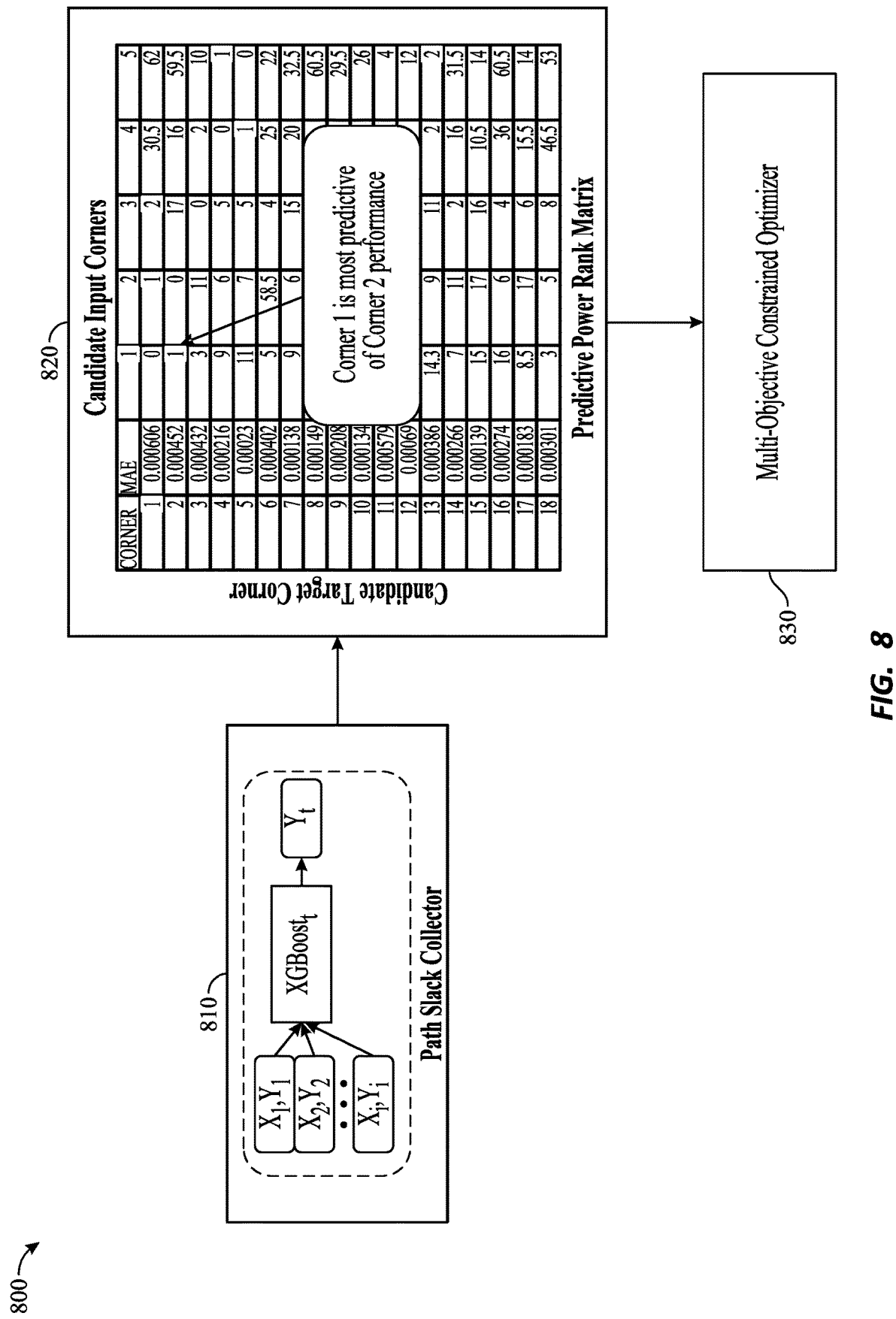
FIG. 8 illustrates an example implementation of a multi-objective optimization pipeline used to select a set of critical test cases to test an integrated circuit design, according to aspects of the present disclosure.

In another aspect, the critical test cases selected for use in testing an integrated circuit design may be selected using a multi-object optimization pipeline, as illustrated in FIG. 8. To select the critical test cases based on a multi-objective optimization, a path slack collector 810 may gather information about timing analyses (e.g., slack or negative slack identified by a static timing analysis of an integrated circuit design) over a data set of test cases. Generally, the timing analyses collected by path slack collector 810 may include timing analysis information for a test case over each of a plurality of paths in the integrated circuit design.

A slack prediction model used by path slack collector 810 may be trained to predict path slack for a given test case based on path slack for the processing path identified for a plurality of other test cases. In some aspects, the slack prediction model may be a gradient boosting model configured to identify, for a first test case from the plurality of target test cases, a second test case from the plurality of target test cases, wherein a timing analysis for the second test case has a highest predictive value of a timing analysis for the first test case. The predicted path slack and an importance metric extracted for each slack prediction model (associated with a unique test case) may be used to create a predictive power rank matrix 820. Predictive power rank matrix 820 generally identifies the test cases that have the highest predictive power for other test cases in the universe of test cases over which a set of critical test cases can be selected. In this case, as illustrated, it may be determined that, based on correlations between the timing performance of Corner 2 and each of the other tested corners, Corner 1 is the most predictive of the performance of Corner 2. That is, generally, if Corner 1 passes a timing test, Corner 2 is also likely to pass a timing test, and if Corner 1 fails the timing test, Corner 2 is also likely to fail the timing test.

Multi-objective constrained optimizer 830 is generally configured to select the critical test cases as a minimal corner set that maximizes a variety of metrics. For example, slack predictive power, slack predictive difficulty, failing path magnitude coverage, failing path coverage, and test case uniqueness metrics may be optimized in selecting the set of critical test cases.

Figure 9:
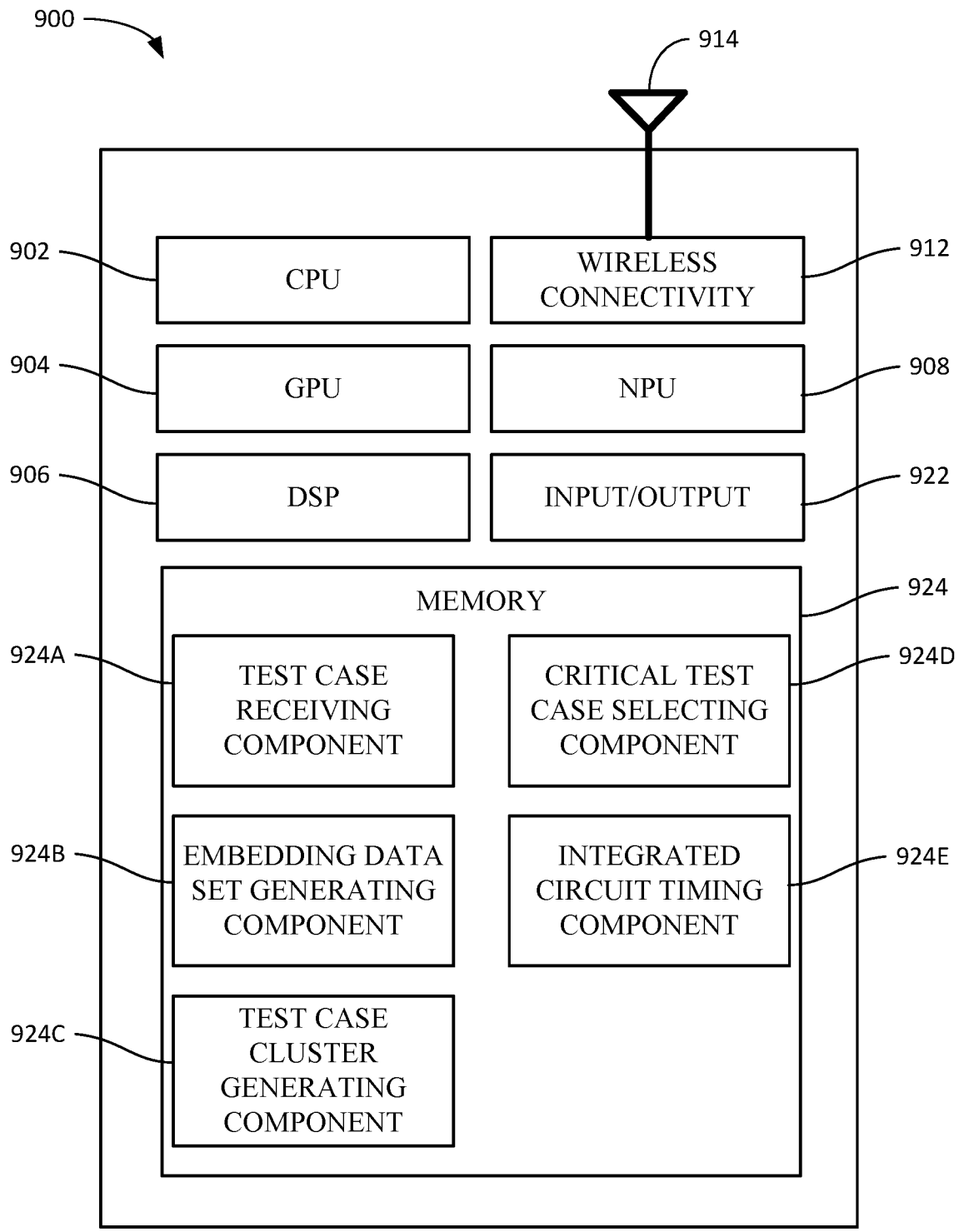
FIG. 9 illustrates an example implementation of a processing system in which an integrated circuit design can be tested based on a set of critical test cases identified by a machine learning model, according to aspects of the present disclosure.

Example Processing Systems for Integrated Circuit Design Test Case Selection Based on Clustering Techniques FIG. 9 depicts an example processing system 900 for selecting test cases for testing integrated circuit designs based on PVT clustering, such as described herein for example with respect to FIG. 3.

Processing system 900 includes a central processing unit (CPU) 902, which in some examples may be a multi-core CPU. Instructions executed at the CPU 902 may be loaded, for example, from a program memory associated with the CPU 902 or may be loaded from a memory partition 924.

Processing system 900 also includes additional processing components tailored to specific functions, such as a graphics processing unit (GPU) 904, a digital signal processor (DSP) 906, a neural processing unit (NPU) 908, a multimedia processing unit 910, a wireless connectivity component 912.

An NPU, such as 908, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 908, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 908 is a part of one or more of CPU 902, GPU 904, and/or DSP 906.

Processing system 900 may also include one or more input and/or output devices 922, such as screens, touch-sensitive surfaces (including touch-sensitive displays), physical buttons, speakers, microphones, and the like.

In some examples, one or more of the processors of processing system 900 may be based on an ARM or RISC-V instruction set.

Processing system 900 also includes memory 924, which is representative of one or more static and/or dynamic memories, such as a dynamic random access memory, a flash-based static memory, and the like. In this example, memory 924 includes computer-executable components, which may be executed by one or more of the aforementioned processors of processing system 900.

In particular, in this example, memory 924 includes test case receiving component 924A, embedding data set generating component 924B, test case cluster generating component 924C, critical test case selecting component 924D, and integrated circuit timing component 924E. The depicted components, and others not depicted, may be configured to perform various aspects of the methods described herein.

Figure 10:
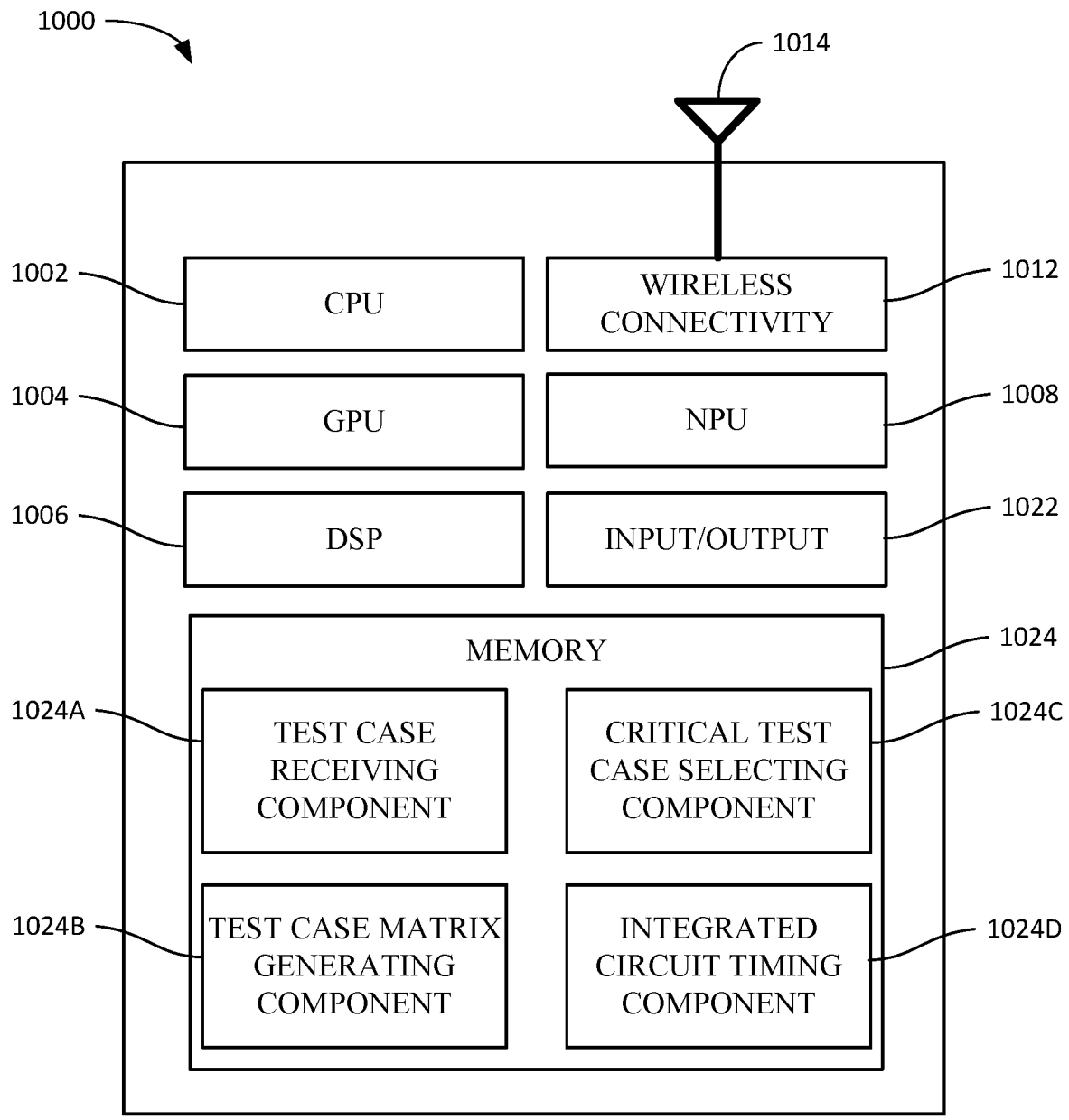
FIG. 10 illustrates an example implementation of a processing system in which an integrated circuit design can be tested based on a set of critical test cases identified for the integrated circuit design, according to aspects of the present disclosure.

FIG. 10 depicts an example processing system 1000 for selecting test cases for testing integrated circuit designs based on timing violation clustering, such as described herein for example with respect to FIG. 6.

Processing system 1000 includes a central processing unit (CPU) 1002, which in some examples may be a multi-core CPU. Instructions executed at the CPU 1002 may be loaded, for example, from a program memory associated with the CPU 1002 or may be loaded from a memory partition 1024.

Processing system 1000 also includes additional processing components tailored to specific functions, such as a graphics processing unit (GPU) 1004, a digital signal processor (DSP) 1006, a neural processing unit (NPU) 1008, a multimedia processing unit 1010, a wireless connectivity component 1012. In one implementation, NPU 1008 is a part of one or more of CPU 1002, GPU 1004, and/or DSP 1006.

Processing system 1000 may also include one or more input and/or output devices 1022, such as screens, touch-sensitive surfaces (including touch-sensitive displays), physical buttons, speakers, microphones, and the like.

In some examples, one or more of the processors of processing system 1000 may be based on an ARM or RISC-V instruction set.

Processing system 1000 also includes memory 1024, which is representative of one or more static and/or dynamic memories, such as a dynamic random access memory, a flash-based static memory, and the like. In this example, memory 1024 includes computer-executable components, which may be executed by one or more of the aforementioned processors of processing system 1000.

In particular, in this example, memory 1024 includes test case receiving component 1024A, test case matrix generating component 1024B, critical test case selecting component 1024C, and integrated circuit timing component 1024D. The depicted components, and others not depicted, may be configured to perform various aspects of the methods described herein.

Example Clauses

Clause 1: A method, comprising: receiving a plurality of test cases for an integrated circuit, each respective test case of the plurality of test cases identifying a set of operating conditions and fabrication properties for the integrated circuit; generating an embedding data set from the plurality of test cases, wherein a respective embedding for a respective test case of the plurality of test cases comprises a mapping of the respective test case into a multidimensional space; generating, based on a clustering model and the embedding data set, a plurality of test case clusters; selecting a plurality of critical test cases for testing the integrated circuit based on the plurality of test case clusters; and timing the integrated circuit based on the plurality of critical test cases.

Clause 2: The method of Clause 1, wherein: the set of operating conditions comprises at least an operating temperature, an operating voltage, and an operating performance regime, and the set of fabrication properties comprise a specification of a transistor process variation, one or more front end of line (FEOL) fabrication parameters, and one or more back end of line (BEOL) fabrication variations.

Clause 3: The method of Clause 2, wherein each test cases specifies a maximum or minimum value for one or more operating conditions in the set of operating conditions.

Clause 4: The method of any one of Clauses 1 through 3, wherein generating the embedding data set from the plurality of test cases comprises, for each respective test case of the plurality of test cases, converting textual descriptions of fabrication properties to one of a plurality of numerical values representing different textual descriptions of the fabrication properties.

Clause 5: The method of any one of Clauses 1 through 4, wherein each test case in the plurality of test cases is associated with a timing analysis.

Clause 6: The method of Clause 5, wherein generating the embedding data set from the plurality of test cases comprises: generating a set of latent space representations of encodings for the plurality of test cases using a first neural network; predicting, using a second neural network, a timing analysis for a second set of test cases based on the timing analysis associated with each test case in the plurality of test cases; and generating, for each respective test case in the plurality of test cases, an embedding in a global test case embedding space based on a latent space representation of an encoding for the respective test case and predicted timing analysis for the respective test case, wherein the global test case embedding space is configured to generate co-located embeddings for test cases with similar predicted timing analyses.

Clause 7: The method of Clause 6, wherein the second neural network comprises a neural network trained to minimize a Laplacian loss.

Clause 8: The method of any one of Clauses 1 through 7, further comprising selecting, based on a machine learning model trained to predict a timing analysis for a set of test cases given an input of timing analyses for a set of input test cases, a target set of test cases, wherein the plurality of critical test cases are selected from the target set of test cases.

Clause 9: The method of Clause 8, wherein selecting the target set of test cases comprises selecting a plurality of test cases based on a mask parameterized by a dropout probability, and wherein the target set of test cases comprises test cases having a dropout probability below a threshold probability.

Clause 10: The method of any one of Clauses 1 through 9, wherein generating the plurality of test case clusters comprises identifying the plurality of clusters by maximizing an intra-cluster difference metric and maximizing an intra-cluster similarity metric.

Clause 11: The method of any one of Clauses 1 through 10, wherein each respective test case in the plurality of critical test cases corresponds to a centroid of a respective test case cluster in the plurality of test case clusters.

Clause 12: The method of any one of Clauses 1 through 11, wherein timing the integrated circuit is further based on a hard macro defining the integrated circuit.

Clause 13: The method of any one of Clauses 1 through 12, further comprising generating, based on a timing failure generated for at least one test case of the plurality of test cases, an engineering change order identifying parameters of the at least one test case and an indication that a design of the integrated circuit is to be revised.

Clause 14: A method, comprising: receiving a data set of timing analyses associated with an input set of test cases for an integrated circuit, each respective test case of the plurality of test cases identifying a set of operating conditions and fabrication properties for the integrated circuit; generating a test case matrix based on the received data set of timing analyses, wherein the test case matrix has dimensions on each of a plurality of axes corresponding to a number of test cases in the plurality of test cases; selecting a plurality of critical test cases for testing the integrated circuit based on the test case matrix; and timing the integrated circuit based on the plurality of critical test cases.

Clause 15: The method of Clause 14, wherein generating the test case matrix comprises generating a matrix with a number of rows and a number of columns corresponding to a number of test cases in the input set of test cases, and wherein each entry in the test case matrix indicates a number of test paths violated in a given pair of test cases.

Clause 16: The method of Clause 15, further comprising generating an embedding for each test case based on a singular value decomposition of the test case matrix.

Clause 17: The method of Clause 16, wherein the embedding for each test case is based on a co-occurrence of test path violations for the given pair of test cases.

Clause 18: The method of any one of Clauses 16 or 17, wherein selecting the plurality of critical test cases for testing the integrated circuit comprises selecting a plurality of test cases by maximizing a distance between each test case of the plurality of test cases.

Clause 19: The method of any one of Clauses 14 through 18, wherein generating the test case matrix based on the received data set of timing analyses comprises: predicting a path slack for each of a plurality of target test cases based on a machine learning model trained to predict the path slack for a respective target test case given path slack associated with other test cases; and generating the test case matrix as a predictive power rank matrix based on the predicted path slack for each of the plurality of target test cases.

Clause 20: The method of Clause 19, wherein the machine learning model comprises a gradient boosting model configured to identify, for a first test case from the plurality of target test cases, a second test case from the plurality of target test cases, wherein a timing analysis for the second test case has a highest predictive value of a timing analysis for the first test case.

Clause 21: The method of any one of Clauses 19 or 20, wherein selecting the plurality of critical test cases for testing the integrated circuit based on the generated test case matrix comprises selecting test cases based on a constrained multiobjective optimization strategy.

Clause 22: The method of Clause 21, wherein the constrained multiobjective optimization strategy is configured to select test cases based on a predictive power of the selected test cases, difficulty of predicting timing analyses for the selected test cases, an amount of a total test case space tested by the selected test cases, a number of failing paths tested, and a uniqueness of the selected test cases.

Clause 23: An apparatus, comprising: a memory having executable instructions stored thereon; and a processor configured to execute the executable instructions to cause the apparatus to perform a method in accordance with of any one of Clauses 1 through 22.

Clause 24: An apparatus, comprising: means for performing a method in accordance with of any one of Clauses 1 through 22.

Clause 25: A non-transitory computer-readable medium having instructions stored thereon which, when executed by a processor, performs a method in accordance with of any one of Clauses 1 through 22.

Clause 26: A computer program product embodied on a computer-readable storage medium comprising code for performing a method in accordance with of any one of Clauses 1 through 22.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving a plurality of test cases for an integrated circuit, each respective test case of the plurality of test cases identifying a set of operating conditions and fabrication properties for the integrated circuit;
generating an embedding data set from the plurality of test cases, wherein a respective embedding for a respective test case of the plurality of test cases comprises a mapping of the respective test case into a multidimensional space;
generating, based on a clustering model and the embedding data set, a plurality of test case clusters;
selecting a plurality of critical test cases for testing the integrated circuit based on the plurality of test case clusters; and
timing the integrated circuit based on the plurality of critical test cases;
wherein:
the set of operating conditions comprises at least an operating temperature, an operating voltage, and an operating performance regime, and
the set of fabrication properties comprise a specification of a transistor process variation, one or more front end of line (FEOL) fabrication parameters, and one or more back end of line (BEOL) fabrication variations.

2. The method of claim 1, wherein each test cases specifies a maximum or minimum value for one or more operating conditions in the set of operating conditions.

3. The method of claim 1, wherein generating the embedding data set from the plurality of test cases comprises, for each respective test case of the plurality of test cases, converting textual descriptions of fabrication properties to one of a plurality of numerical values representing different textual descriptions of the fabrication properties.

4. The method of claim 1, wherein each test case in the plurality of test cases is associated with a timing analysis.

5. The method of claim 4, wherein generating the embedding data set from the plurality of test cases comprises:
generating a set of latent space representations of encodings for the plurality of test cases using a first neural network;
predicting, using a second neural network, a timing analysis for a second set of test cases based on the timing analysis associated with each test case in the plurality of test cases; and
generating, for each respective test case in the plurality of test cases, an embedding in a global test case embedding space based on a latent space representation of an encoding for the respective test case and predicted timing analysis for the respective test case, wherein the global test case embedding space is configured to generate co-located embeddings for test cases with similar predicted timing analyses.

6. The method of claim 5, wherein the second neural network comprises a neural network trained to minimize a Laplacian loss.

7. The method of claim 1, further comprising selecting, based on a machine learning model trained to predict a timing analysis for a set of test cases given an input of timing analyses for a set of input test cases, a target set of test cases, wherein the plurality of critical test cases are selected from the target set of test cases.

8. The method of claim 7, wherein selecting the target set of test cases comprises selecting a plurality of test cases based on a mask parameterized by a dropout probability, and wherein the target set of test cases comprises test cases having a dropout probability below a threshold probability.

9. The method of claim 1, wherein generating the plurality of test case clusters comprises identifying the plurality of clusters by maximizing an intra-cluster difference metric and maximizing an intra-cluster similarity metric.

10. The method of claim 1, wherein each respective test case in the plurality of critical test cases corresponds to a centroid of a respective test case cluster in the plurality of test case clusters.

11. The method of claim 1, wherein timing the integrated circuit is further based on a hard macro defining the integrated circuit.

12. The method of claim 1, further comprising generating, based on a timing failure generated for at least one test case of the plurality of test cases, an engineering change order identifying parameters of the at least one test case and an indication that a design of the integrated circuit is to be revised.

13. A system, comprising:
at least one memory having executable instructions stored thereon; and
one or more processors configured to execute the executable instructions to cause the system to:
receive a plurality of test cases for an integrated circuit, each respective test case of the plurality of test cases identifying a set of operating conditions and fabrication properties for the integrated circuit;
generate an embedding data set from the plurality of test cases, wherein a respective embedding for a respective test case of the plurality of test cases comprises a mapping of the respective test case into a multidimensional space;
generate, based on a clustering model and the embedding data set, a plurality of test case clusters;
select a plurality of critical test cases for testing the integrated circuit based on the plurality of test case clusters, each respective test case in the plurality of critical test cases corresponding to a centroid of a respective test case cluster; and
time the integrated circuit based on the plurality of critical test cases and a hard macro defining the integrated circuit;
wherein:
each test case in the plurality of test cases is associated with a timing analysis; and
in order to generate the embedding data set from the plurality of test cases, the one or more processors are configured to:
generate a set of latent space representations of encodings for the plurality of test cases using a first neural network;
predict, using a second neural network, a timing analysis for a second set of test cases based on the timing analysis associated with each test case in the plurality of test cases; and
generate, for each respective test case in the plurality of test cases, an embedding in a global test case embedding space based on a latent space representation of an encoding for the respective test case and predicted timing analysis for the respective test case, wherein the global test case embedding space is configured to generate co-located embeddings for test cases with similar predicted timing analyses.

14. The system of claim 13, wherein in order to generate the embedding data set from the plurality of test cases, the one or more processors are configured to convert, for each respective test case of the plurality of test cases, textual descriptions of fabrication properties to one of a plurality of numerical values representing different textual descriptions of the fabrication properties.

15. The system of claim 13, wherein the one or more processors are further configured to select, based on a machine learning model trained to predict a timing analysis for a set of test cases given an input of timing analyses for a set of input test cases, a target set of test cases, wherein the plurality of critical test cases are selected from the target set of test cases.

16. The system of claim 13, wherein in order to generate the plurality of test case clusters, the one or more processors are configured to identify the plurality of clusters by maximizing an intra-cluster difference metric and maximizing an intra-cluster similarity metric.

\* \* \* \* \*